United States Patent [19]

Moore

[11] 4,044,776
[45] Aug. 30, 1977

[54] CORN KERNEL CUTTER

[76] Inventor: Kenneth C. Moore, 5024 N. Lake Road, Columbiaville, Mich. 48421

[21] Appl. No.: 595,765

[22] Filed: July 14, 1975

[51] Int. Cl.² .............................................. A01F 11/06
[52] U.S. Cl. .................................................. 130/9 D
[58] Field of Search ....................... 130/9 C, 9 D, 9 A

[56] References Cited

U.S. PATENT DOCUMENTS

| 281,588 | 7/1883 | Warfield | 130/9 A |
| 296,066 | 4/1884 | Roberts | 130/9 C |
| 327,864 | 10/1885 | Collins | 130/9 C |
| 1,965,469 | 7/1934 | Patchen | 130/9 A |
| 2,467,052 | 4/1949 | Roberts | 130/9 A |
| 2,566,568 | 9/1951 | Ives | 130/9 D |

*Primary Examiner*—Russell R. Kinsey
*Attorney, Agent, or Firm*—Arnold S. Weintraub

[57] ABSTRACT

A device for removing kernels of corn from the cob. The cob is rotatably mounted on a shaft and an axially movable blade engages the cob as it rotates to remove the kernels therefrom. A container is provided for collecting the kernels as they are severed from the cob.

7 Claims, 5 Drawing Figures

CORN KERNEL CUTTER

BACKGROUND OF THE INVENTION

1. Field of the Invention

The present invention pertains to devices for removing corn kernels from cobs. More particularly, the present invention pertains to devices for removing and collecting corn kernels from the cobs. Even more particularly, the present invention pertains to devices for removing and collecting the kernels of corn from a rotating cob.

2. Prior Art

Under present economic conditions many homeowners have begun growing and canning their own vegetables and fruits, as a cost saving measure. One of the more common foodstuffs grown is corn. While corn is easily consumed as a fresh foodstuff, there is great difficulty in removing the kernels of the corn from the cob, for canning or otherwise preservering it. This is especially true with respect to green or raw corn.

There exists many industrial-type machines for removing kernels of corn from the cobs. These devices are adapted for removing the kernels from a plurality of cobs at any one time. See, inter alia, U.S. Pat. No. 2,169,963. Such devices are not readily adapted for home use.

There has been disclosed heretofore devices for removing kernels of corn from the cob and which are adapted for home use. See, inter alia, U.S. Pat. Nos. 2,566,568; 1,965,469; 879,457; 240,052, and 1,801,192.

The present invention, on the other hand, provides a corn kernel cutter of increased efficiency and which is adapted for home usage.

SUMMARY OF THE INVENTION

In accordance with the present invention there is provided a device for removing the kernels from a corn cob. The device hereof includes means for rotating the cob or ear, means for cutting or severing the kernels therefrom while the cob rotates, and means for moving the cutting means.

The means for rotating comprises a rotatable shaft having means for mounting a corn cob thereon associated therewith.

The means for cutting or severing the kernels comprises a cutting blade which envelopes the cob of corn as it severs the kernels therefrom.

The means for moving the cutting means comprises an axially moveable support to which the cutting means is mounted.

The present invention further includes means for collecting the kernels as they are severed from the cob.

For a more complete understanding of the present invention reference is made to the following detailed description and accompanying drawing. In the drawing, like reference characters refer to like parts throughout the several views in which:

DESCRIPTION OF THE PREFERRED EMBODIMENTS

Figure 1:
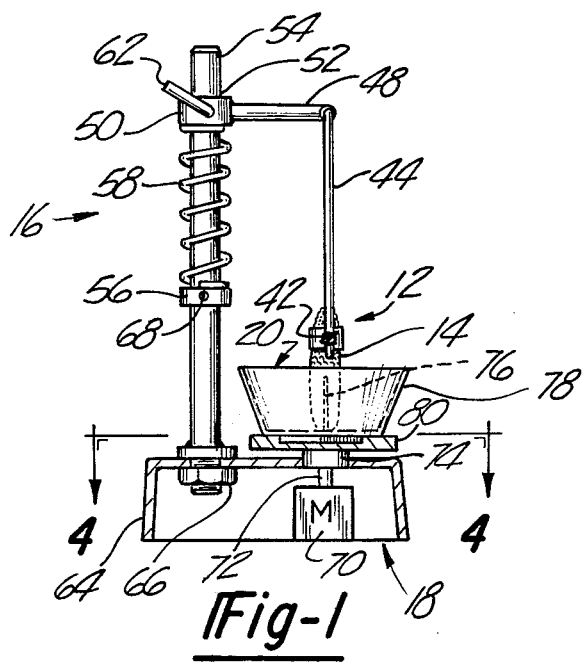
FIG. 1 is a side elevational view, partly in crosssection, of the corn kernel cutter of the present invention.
Figure 2:
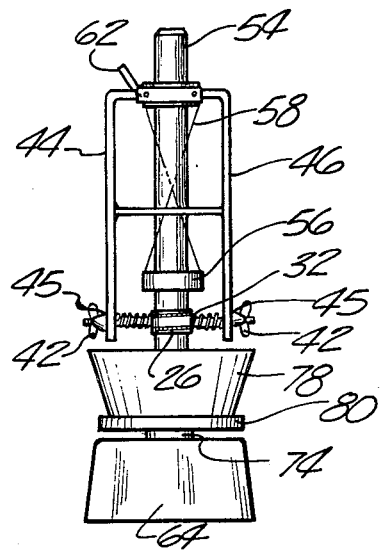
FIG. 2 is a front elevational view of the corn kernel cutter of the present invention.
Figure 3:
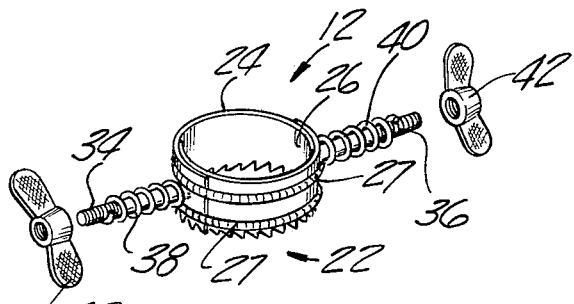
FIG. 3 is a perspective view of the cutting blade employed in the practice of the present invention.

Now, with reference to the drawing, there is depicted therein, the corn kernel cutter of the present invention, generally denoted at 10. The present invention generally comprises means 12 for cutting the kernels from an ear or cob of corn 14; means 16 for moving the cutting means 12, and means 18 for rotating the corn 14 during the cutting operation. The corn kernel cutter 10 also includes means 20 for collecting the kernels of corn cut from the ear.

With more particularity, the means 12 for cutting the kernels of corn from the ear 14 includes a circular blade 22 which is vertically axially aligned with the ear 14. The blade 22 comprises a pair of semi-circular members 24, 26, one of which partially envelops the other, as shown. The blades are biassed together by means, such as a spring 27, to maintain a close relationship therebetween. Furthermore, the biassing means enables the two members 24, 26, to be biassed outwardly or inwardly to tightly enshroud the ear of corn 14 during the cutting operation. Optionally, the blade 22 can be provided with serrations 28 for facilitating the cutting. However, it is to be noted that the rotation of the ear of corn, to be described subsequently, negates the necessity for the serrations. However, and as above noted, the serrations 28 may be included.

Extending laterally outwardly from blade 22 are arms 30, 32, respectively. The arms are removably or detachably secured to the blades, and specifically blade member 24, in any suitable fashion, including threadably secured and the like. Each arm 30, 32 is provided with external threading 34, 36, respectively, along the extent thereof. Biassing means, such as springs 38, 40 are mounted on the arms 30, 32, as shown. The ends of each arm 30, 32 each receive a wing nut 42 or the like which threadably mounts the cutting arms 30, 32 to the means 16, in a manner to be described subsequently. Furthermore, the inter-action between the biassing means 27, the threaded arms 30, 32, the biassing means 38, 40 and the wing nuts 42 impart the proper tensioning to the cutting blades to quickly and cleanly sever the kernels from the cob 14.

The means for moving 16 generally comprises a pair of spaced apart downwardly depending arms 44, 46. The arms 44, 46 lie in substantially the same vertical plane as the ear 14 to maintain the axial alignment of the cutting means 12. Each arm includes a throughbore 45 through which the arms 30, 32 extend. The wing nuts 42 securely mount the cutting means to the arms 44, 46 by threaded attachment. The other ends of the arms 44, 46 are connected to a lateral arm 48. The other end of the lateral arm 48 is connected to a mounting member 50. The mounting member 50 includes a central aperture 52 which is journalled onto a vertically extending shaft 54. In this manner the means 16 is rendered vertically slidable along the extent of the shaft 54.

The means 16 further includes a slidably mounted member 56 which is downwardly spaced apart from the member 50. Biassing means, such as a spring 58 is disposed between the mounting members 50, 56 and is connected thereto. The spring 58 envelops the shaft 54, as shown. The spring 58 facilitates the vertical movement of the means 16.

In order to render the means 16 rigid, a cross-beam extends between the downwardly depending arms 44, 46 and is secured thereto, such as by welding or the like.

In order to render the means 16 rotatably adjustable in a horizontal plane, a locking arm 62 is associated with the mounting member 50. The locking arm 62 is adapted to abut against the shaft 54 to securely lock the mounting member 50 thereonto. This is achieved by rotating the locking arm in a first direction. By reversing the direction of rotation of the locking arm 62, the mounting member 50 is unlocked. This permits the entire means 16 to be rotated about the shaft thereby permitting access to the corn 14 for mounting or removing same.

As hereinbefore noted, the means 16 is mounted on a vertically extending shaft 54. The shaft has its lower end mounted on a housing 64 which provides a seat for the shaft. The lower end of the shaft 54 is threadably secured or otherwise mounted to the housing, such as that shown at 66.

It should be further noted with respect hereto, that in order to obviate the possibility of the means 16 constantly falling on the shaft, an adjusting set screw 68 is provided and is associated with the lower mounting member 56, as shown. By proper adjustment of the screw 68 the axial movement of the means 16 on the shaft 54 can be controlled.

Referring to FIG. 1, disposed within the housing 64 is a motor 70. The motor is connected to an electrical source (not shown) which operates the motor. Extending upwardly from the motor is a rotatable shaft 72. The shaft rotates in a well known manner and extends upwardly through a bearing 74 provided in the housing 64. A prong or tine 76 is mounted to the shaft at the upper terminus thereof. The prong 75 is adapted to be inserted into the core of the ear of corn 14 to thereby mount the ear of corn onto the shaft. It is to be, thusly, appreciated that as the shaft rotates so does the ear of corn.

In accordance with the present invention, as an ear of corn is rotated on the shaft, by virtue of the tine, the cutting means 12 is slowly brought into engagement with the ear of corn by the vertical axial movement of the means 16. Because of the biassing of the blade 22 the cutting means 12 snuggly and tightly envelops the ear of corn. Further downward axial movement of the means 16 causes the means 12 to sever or cut the kernels of corn from the ear as the ear rotates.

In order to facilitate collection of the kernels of corn as they are removed from the ear, means 20 for collecting the kernels can also be included herewith. The means 20 includes a bowl 78 which is mounted on a support plate 80. The bowl 78, is preferably, concentric with the shaft such that the shaft extends upwardly centrally into the center of the bowl.

Figure 4:
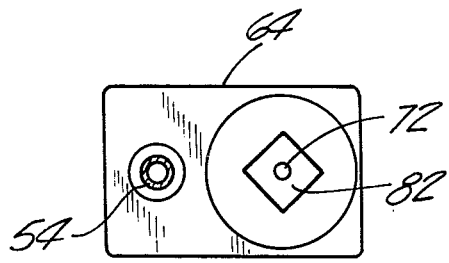
FIG. 4 is a top elevational view taken along the line 4—4 of FIG. 1.

As shown in FIG. 4, the support plate 80 is journalled on the shaft 72. A bearing 82 is mounted on the plate 80. The shaft 72 extends through the plate 80 and has the bearing mounted thereon. By providing the bearing, the support plate and bowl remain stationary as the shaft rotates.

Thus, as the kernels of corn are severed from the ear, they are collected within the bowl 78.

It should further be noted with respect hereto that in the event replacement of the blades 24, 26 is necessary, then by merely removing the arms 30, 32 therefrom, and by detaching the biassing means, then replacement of the blades is effectuated. Furthermore, it should be noted that such replacement is a rare occurrence. Because of the cooperation between the cutting blades and the rotation of the ears of corn removal or severance of the kernels is enhanced.

Figure 5:
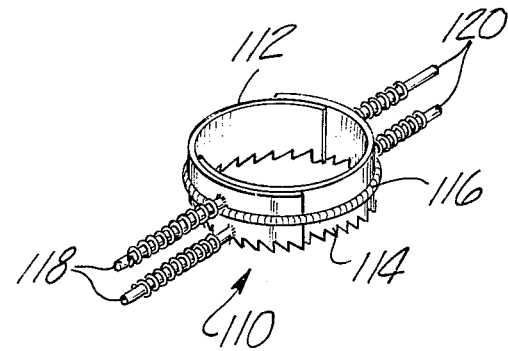
FIG. 5 is a perspective view depicting an alternate embodiment of the cutting means.

Referring now to FIG. 5, there is depicted therein an alternate form of the cutting means, generally indicated at 110. According to this embodiment, the blade members 112, 114 are biassed together via a biassing means, such as a spring 116. Laterally extending from opposite sides of the member 112 are pairs of arms 118, and 120 respectively. The arms of each pair 118 or 120 are coextensive and parallel to each other. Each arm is threaded and has a biassing means (not shown) mounted thereon. The arms are secured to the mounting means in the manner heretofore described. In all other respects this embodiment is the same as the first embodiment of the invention. By providing pairs of lateral arms, however, it has been found that any tendency of the blade members to rotate about a horizontal axis is negated.

Having thus described the invention, what is claimed is:

1. A device for severing kernels of corn from a cob, comprising:
   a. means for rotating an ear of corn,
   b. means for cutting the kernels from the ear, the means for cutting engaging the ear of corn as it rotates, the means for cutting comprising:
      1. a pair of semi-circular cutting members, the members each having a portion thereof overlapping the other member, the members cooperating to define a circular cutting blade, and
      2. means biassing the cutting members toward each other and enveloping the cutting members,
   c. means for vertically moving the means for cutting, the means for moving comprising:
      1. a pair of downwardly depending arms, each arm being connected to the cutting means,
      2. a first movable member connected to the depending arms,
      3. a second movable member spaced apart from the first movable member,
      4. biassing means disposed between the movable members and secured thereto, and
      5. a vertically extending shaft, the movable members being axially slidably mounted onto the shaft, such that vertical movement of the movable members along the shaft causes contemporaneous movement of the cutting means,
   d. means for mounting the cutting means to the moving means, the mounting means comprising:
      1. a pair of threaded arms, one end of each arm being removably attached to one of the cutting members, the other end being connected to an associated one of the depending arms,
      2. biassing means mounted on each threaded arm, and
      3. means for threadably securing each of the threaded arms to the associated depending arm, and
   wherein the ear of corn is vertically aligned, the cutting means moving along the vertical extent thereof as the ear rotates.

2. A device for severing kernels of corn from a cob, comprising:
   a. means for rotating an ear of corn, comprising:
      1. a motor,
      2 a rotatable shaft connected to the motor, and 3. a tine connected to the other end of the shaft, the tine being insertable into the core of the ear of the corn,
  1. a pair of semi-circular cutting members, the members each having a portion thereof overlapping the other member, the members cooperating to define a circular cutting blade, and
  2. means biassing the cutting members toward each other and enveloping the cutting members,
 c. means for vertically moving the means for cutting along the extent of the ear of corn,
 d. means for mounting the means for cutting to the means for vertically moving the cutting means, and
wherein the ear of corn is vertically aligned, the cutting means moving along the vertical extent thereof as the ear rotates.

3. The device of claim 2 which further comprises:
means for collecting the severed kernels of corn, the means for collecting being stationarily mounted on the rotatable shaft.

4. The device of claim 2 which further comprises:
means for collecting the severed kernels of corn.

5. A device for severing kernels of corn from a cob, comprising:
 a. means for rotating an ear of corn, comprising:
  1. a motor,
  2. a rotatable shaft connected to the motor, and
  3. a tine connected to the other end of the shaft, the tine being insertable into the core of the ear of corn,
 b. means for cutting the kernels from the ear, the means for cutting engaging the ear of corn as it rotates, the means for cutting comprising:
  1. a pair of semi-circular cutting members, the members each having a portion thereof overlapping the other member, the members cooperating to define a circular cutting blade, and
  2. means biassing the cutting members toward each other and enveloping the cutting members,
 c. means for vertically moving the means for cutting along the extent of the ear of corn, the means for mounting, comprising:
  1. a pair of downwardly depending arms interconnected to the cutting means,
  2. a first movable member connected to the depending arms,
  3. a second movable member spaced apart from the first movable member,
  4. biassing means disposed between the movable members and secured thereto,
  5. a vertically extending shaft, the movable members being axially slidably mounted onto the shaft such that vertical movement of the movable members along the shaft causes contemporaneous movement of the cutting means,
 d. means for mounting the means for cutting to the depending arms of the means for moving, and
wherein the ear of corn is vertically aligned, the cutting means moving along the vertical extent thereof as the ear rotates.

6. The device of claim 5 which further comprises:
means for collecting the severed kernels of corn stationarily mounted on the rotatable shaft.

7. The device of claim 6 wherein the means for mounting comprises:
a pair of threaded arms, one end of each arm being detachably secured to one of the cutting members,
biassing means mounted one each arm,
means for threadably connecting the other end of each arm to an associated depending arm, and
wherein the cutting means and depending arms lie in substantially vertical planar alignment with an ear of corn mounted on the tine.

* * * * *